US011061258B2

(12) United States Patent
Saito et al.

(10) Patent No.: US 11,061,258 B2
(45) Date of Patent: Jul. 13, 2021

(54) MOLD FOR PLASTIC LENS, METHOD FOR MANUFACTURING PLASTIC LENS, AND PLASTIC LENS FOR EYEGLASSES

(71) Applicants: Kiyohiro Saito, Tokyo (JP); Takashi Suzuki, Tokyo (JP); Kenji Tanagawa, Tokyo (JP); Kiyonori Sato, Tokyo (JP)

(72) Inventors: Kiyohiro Saito, Tokyo (JP); Takashi Suzuki, Tokyo (JP); Kenji Tanagawa, Tokyo (JP); Kiyonori Sato, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 293 days.

(21) Appl. No.: 15/129,808

(22) PCT Filed: Mar. 25, 2015

(86) PCT No.: PCT/JP2015/001691
§ 371 (c)(1),
(2) Date: Sep. 27, 2016

(87) PCT Pub. No.: WO2015/146163
PCT Pub. Date: Oct. 1, 2015

(65) Prior Publication Data
US 2017/0131573 A1    May 11, 2017

(30) Foreign Application Priority Data
Mar. 28, 2014  (JP) .............................. JP2014-067743

(51) Int. Cl.
*G02C 7/12* (2006.01)
*B29C 45/56* (2006.01)
(Continued)

(52) U.S. Cl.
CPC .......... *G02C 7/12* (2013.01); *B29C 45/14065* (2013.01); *B29C 45/561* (2013.01);
(Continued)

(58) Field of Classification Search
CPC ........... B29C 2045/14139; B29C 2045/14131; B29C 2045/14122; B29C 45/14065;
(Continued)

(56) References Cited

U.S. PATENT DOCUMENTS 5,494,615 A  *  2/1996  Wang Lee ............. B29D 12/02
                                                              264/1.7
5,922,246 A      7/1999  Matsushita et al.
(Continued)

FOREIGN PATENT DOCUMENTS

JP      S61-56090 B2    12/1986
JP      H09-43550 A      2/1997
(Continued)

OTHER PUBLICATIONS

Jun. 23, 2015 International Search Report issued in International Patent Application No. PCT/JP2015/001691.
(Continued)

*Primary Examiner* — Michael M. Robinson
(74) *Attorney, Agent, or Firm* — Oliff PLC

(57) ABSTRACT

A mold for a plastic lens that arranges an insert member inside a cavity formed between a pair of halved molds, injects and fills molten raw material resin to mold a plastic lens having a predetermined shape, integrally with the insert member. The insert member is arranged on a molding surface on one of the halved molds, a notch to be engaged with a positioning tab formed at a periphery of the insert member is engraved on one parting surface of the halved mold, overlapping with a gate position. Positioning of the insert member is performed by engaging the positioning tab with the notch. With this configuration, in molding a plastic lens having an insert member by injection molding including insert molding, positioning of the insert member is performed at the gate position without deteriorating the quality (Continued)

of a molded product and without increasing the load of post-processing after molding.

10 Claims, 10 Drawing Sheets

(51) Int. Cl.
*B29C 45/14* (2006.01)
*B29D 11/00* (2006.01)
*G02B 1/04* (2006.01)
*G02B 5/30* (2006.01)
*B29L 11/00* (2006.01)

(52) U.S. Cl.
CPC .... *B29D 11/00028* (2013.01); *B29D 11/0048* (2013.01); *B29D 11/00644* (2013.01); *G02B 1/041* (2013.01); *G02B 5/3033* (2013.01); *B29C 2045/14139* (2013.01); *B29L 2011/0016* (2013.01); *B29L 2011/0033* (2013.01); *B29L 2011/0066* (2013.01)

(58) Field of Classification Search
CPC ... B29C 45/561; G02C 7/12; B29D 11/00028; B29D 11/0048; B29D 11/00644; G02B 1/041; G02B 5/3033; B29L 2011/0016; B29L 2011/0033; B29L 2011/0066
See application file for complete search history.

(56) References Cited

U.S. PATENT DOCUMENTS

| | | | |
|---|---|---|---|
| 6,210,610 B1* | 4/2001 | Saito | B29C 45/2701 |
| | | | 264/2.2 |
| 2002/0050658 A1* | 5/2002 | Richard | B29D 11/0073 |
| | | | 264/1.32 |
| 2006/0028613 A1 | 2/2006 | Yasuda | |
| 2007/0036878 A1* | 2/2007 | Goodenough | B29D 11/00038 |
| | | | 425/542 |
| 2015/0248023 A1 | 9/2015 | Kimura et al. | |

FOREIGN PATENT DOCUMENTS

| | | |
|---|---|---|
| JP | 2002-316339 A | 10/2002 |
| JP | 2006-047586 A | 2/2006 |
| JP | 2007-152704 A | 6/2007 |
| WO | 2014/030603 A1 | 2/2014 |

OTHER PUBLICATIONS

Jun. 23, 2015 Written Opinion of the International Searching Authority issued in International Patent Application No. PCT/JP2015/001691.

* cited by examiner (a)

(b)

MOLD FOR PLASTIC LENS, METHOD FOR MANUFACTURING PLASTIC LENS, AND PLASTIC LENS FOR EYEGLASSES

TECHNICAL FIELD

The present invention relates to a mold for plastic lens, used for molding a plastic lens including an insert member having functionality, a method for manufacturing a plastic lens using such a mold, and a plastic lens for eyeglasses, manufactured using such a mold.

BACKGROUND ART

There is a known method referred to as an injection molding method using thermoplastic resin as a method for molding a plastic lens for eyeglasses. With the injection molding method, it is possible to mold a plastic lens having a complex optical surface shape by filling molten resin into a cavity formed with a mold having a shape corresponding to the optical surface, and by solidifying the molten resin. For example, it is possible to mold a progressive power lens having a varied shape and power along the up-down direction of the lens.

With an insert molding having an additional step of arranging an insert member inside a cavity beforehand, it would be possible, with injection molding, to mold a functional lens integrating the insert member with the lens.

With the insert molding, it is possible, for example, to mold a polarizing lens that suppresses transmission of reflected light by using a polarizing film as the insert member.

The polarizing film has a polarization axis in a fixed direction. After a polarizing lens is molded integrally with a polarizing film, the polarizing lens is incorporated into an eyeglass frame such that the polarization axis is horizontal, whereby it is possible to mold eyeglasses capable of limiting transmission of a polarization component vibrating in a horizontal direction, included in the reflected light, and capable of selectively transmitting a polarization component vibrating in a vertical direction.

Both the progressive power lens and the polarizing lens can be molded by injection molding. Accordingly, by employing a mold corresponding to a progressive power lens shape, or the like, and employing a polarizing film as an insert member, it is possible to mold a plastic lens having both of these functions.

Since the progressive power lens has directivity in the shape, or the like, and the polarizing lens has directivity based on the polarization axis, it is necessary to preliminarily position the polarizing film in an appropriate direction on the basis of a relationship with a mold corresponding to the lens shape.

As a technique related to positioning of the polarizing film, Patent Literatures 1 and 2 disclose an insert member (polarizing sheet) with a perfect circle-like shape, having a positioning tab.

With such an insert member, the polarization axis direction is determined on the basis of the tab direction, and thus, it is possible to reasonably mold a plastic lens combining a function of a progressive power lens and a function of a polarizing lens, by performing tab positioning in accordance with vertical-horizontal directions set on the mold.

CITATION LIST

Patent Literature

Patent Literature 1: JP 2006-47586 A
Patent Literature 2: JP 61-56090 B

SUMMARY OF INVENTION

Technical Problem

Meanwhile, the positioning tab is an unneeded portion as a product, and thus, needs to be removed from a molded lens. In a case where positioning of the insert member is performed with the positioning tab being set at a position away from the gate, as described in FIG. 3, or the like, in Patent Literature 2, it would be necessary to cut and remove the positioning tab in addition to a gate cut procedure, that is, a procedure of removing resin in a passage (runner) connected to the gate, from the molded product after molding, and thus, would make the work procedure complicated.

In addition, a gate trace remaining on a molded product or a trace portion remaining after cutting of the positioning tab is likely to generate a liquid pool at dip coating performed in a post-step. Generation of the liquid pool might lead to uneven coating and product defects. When this trace portion is at one location, suppressing generation of the liquid pool to a certain extent would be possible by directing the corresponding portion downward. When the trace portion caused by the cutting is at two locations, however, even though it is possible to direct one trace portion downward, it is difficult to avoid a liquid pool on the other trace portion.

The present invention has been made in view of the above-described issues, and an object thereof is to provide a mold for a plastic lens, capable of producing a plastic lens having a predetermined insert member by insert molding while maintaining the quality of a mold product and being capable of saving labor in post-processing of the molded product, and to provide a method for manufacturing a plastic lens using such a mold for a plastic lens.

Solution to Problem

A mold for a plastic lens, according to the present invention, is configured to arrange an insert member inside a cavity formed between a pair of halved molds, inject and fill molten raw material resin so as to mold a plastic lens having a predetermined shape, integrally with the insert member. The mold is configured such that the insert member is arranged on a molding surface on one of the halved molds, a notch to be engaged with a positioning tab formed at a periphery of the insert member is engraved on one parting surface of the halved mold, overlapping with a gate position, and positioning of the insert member is performed by engaging the positioning tab with the notch.

Furthermore, a method for molding a plastic lens according to the present invention is a method for manufacturing a plastic lens having a predetermined shape by injecting and filling molten raw material resin into a cavity formed between a pair of halved molds. This method uses the above-described mold for a plastic lens, arranges an insert member on a molding surface on one of the halved mold, and manufactures the plastic lens with a predetermined shape, integrally with the insert member by injecting and filling the molten raw material resin.

Furthermore, a plastic lens for eyeglasses, according to the present invention, is a plastic lens for eyeglasses that is molded to have a predetermined shape by injecting and filling molten raw material resin into a cavity formed between a pair of halved molds. This lens is configured to be molded by using the above-described mold for a plastic lens, arranging an insert member on a molding surface on one of the halved molds, and injecting and filling molten raw material resin so as to be molded integrally with the insert member.

Advantageous Effects of Invention

According to the present invention, in molding a plastic lens having an insert member by insert molding, it is possible to maintain the quality of a mold product and capable of saving labor in post-processing of the molded product.

DESCRIPTION OF EMBODIMENTS

Hereinafter, embodiments of the present invention will be described with reference to the drawings.

[Injection Molding Apparatus]

Figure 1:
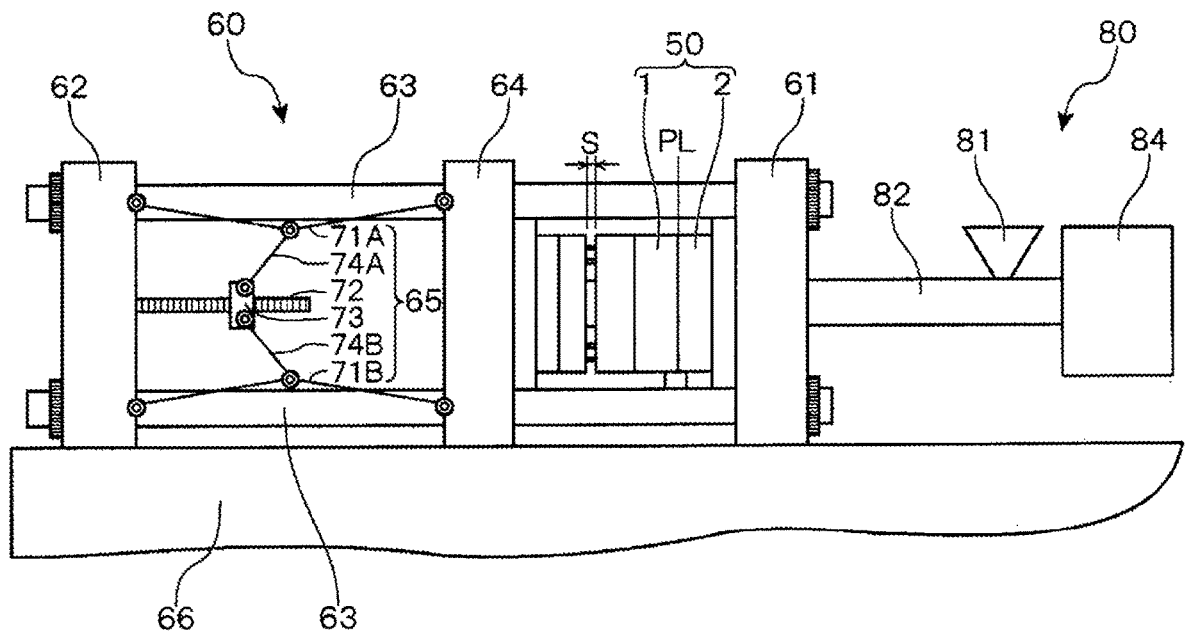
FIG. 1 is a diagram illustrating an exemplary injection molding apparatus.

FIG. 1 is a diagram illustrating an exemplary injection molding apparatus configured to mold a plastic lens by using a mold for a plastic lens according to the present embodiment.

An injection molding apparatus illustrated in FIG. 1 includes a mold 50, a mold clamping apparatus 60, and an injection apparatus 80. The mold 50 includes a movable mold 1 and a fixed mold 2 as a pair of halved molds to be split at a parting line PL. The mold clamping apparatus 60 performs open-close and clamping of the mold 50 using a toggle link mechanism 65. The injection apparatus 80 melts, kneads, and weighs, in a heating cylinder 82, raw material resin fed from a hopper 81 and injects the resin from a nozzle 85.

[Injection Apparatus]

The injection apparatus 80 included in the injection molding apparatus illustrated in FIG. 1 includes the heating cylinder 82 having the nozzle 85 at a tip end portion. Inside the heating cylinder 82, a screw is provided. Rotation and reciprocating movement of the screw are controlled by a drive unit 84.

The hopper 81 is connected to abase end side of the heating cylinder 82. The hopper 81 feeds pellet-like raw material resin into the heating cylinder 82. The raw material resin fed from the hopper 81 into the heating cylinder 82 is sheared and crushed by a screw rotating inside the heating cylinder 82, and at the same time, while being melted and kneaded by shearing heat and the heat generated by a heater included in the heating cylinder 82, transmitted to a cylinder front chamber formed between the tip end of the screw and the nozzle 85 and weighed. Thereafter, the raw material resin of a predetermined amount, being in a melting state, adjusted to a viscosity suitable for injection molding, is injected from the nozzle 85.

[Mold Clamping Apparatus]

On the injection molding apparatus illustrated in FIG. 1, the mold clamping apparatus 60 includes a plurality of tie bars 63 between a fixed die plate 61 and a rear plate 62, installed on a frame 66 with a predetermined interval, and is configured such that a movable die plate 64 becomes movable, being guided by the tie bar 63. The mold 50 is mounted between the fixed die plate 61 and the movable die plate 64. The toggle link mechanism 65 is mounted between the rear plate 62 and the movable die plate 64.

With this mechanism, when the toggle link mechanism 65 is operated, the movable die plate 64 is guided by the tie bar 63 to reciprocate, and along with this, open-close and clamping of the mold 50 are performed.

The toggle link mechanism 65 is configured such that a screwed crosshead 73 moves along a ball screw 72 connected to a motor (not illustrated), together with the rotation of the ball screw 72. Subsequently, when the crosshead 73 moves to the movable die plate 64 side, toggle links 71A and 71B linearly extend by connection links 74A and 74B, and the movable die plate 64 moves (advances) to approach the fixed die plate 61. In contrast, when the crosshead 73 moves to the rear plate 62 side, the toggle links 71A and 71B bend inwardly by connection links 74A and 74B, and the movable die plate 64 moves (retreats) away from the fixed die plate 61.

[Mold]

Figure 2:
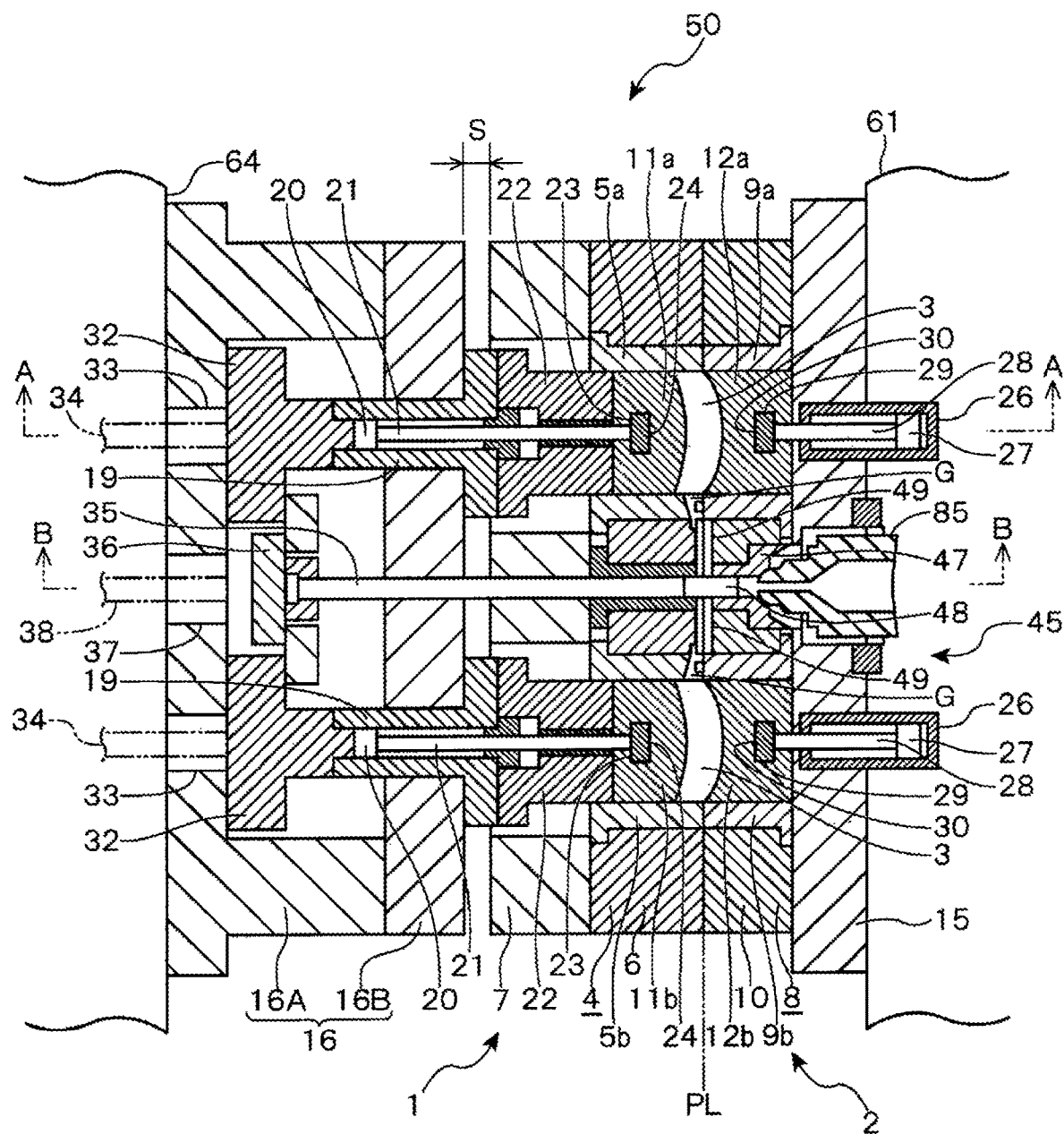
FIG. 2 is a cross-sectional view of a mold included in the injection molding apparatus illustrated in FIG. 1.
Figure 3:
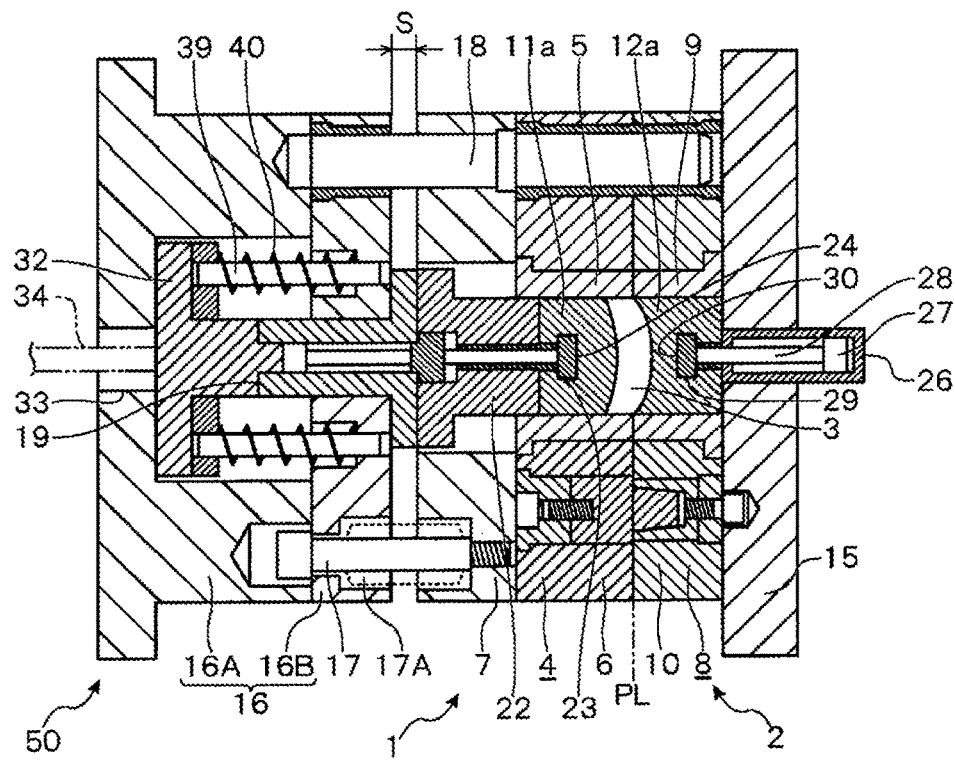
FIG. 3 is a cross-sectional view of FIG. 2, taken along line A-A.
Figure 4:
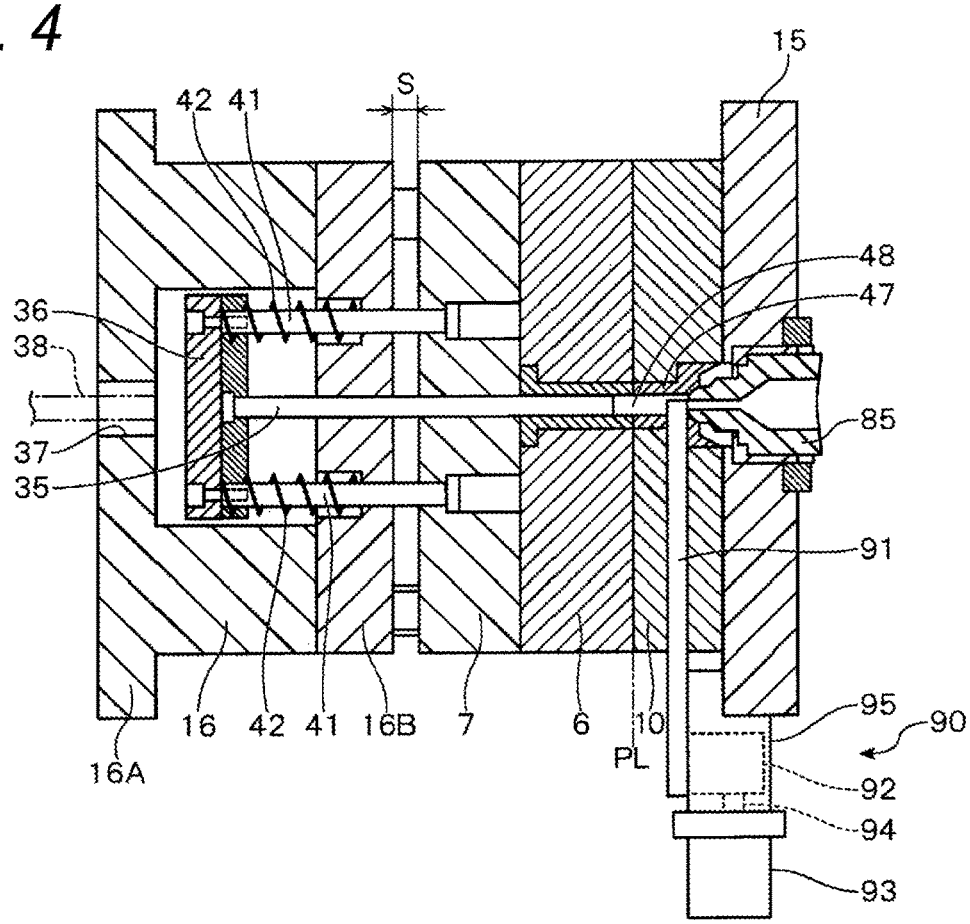
FIG. 4 is a cross-sectional view of FIG. 2, taken along line B-B.

FIG. 2 is a cross-sectional view of the mold 50 illustrated in FIG. 1, and illustrates a cross-section cut at a surface perpendicular to a sheet surface passing through the center axis and an initial state of mold closing. FIG. 3 is a cross-sectional view of FIG. 2, taken along line A-A and FIG. 4 is a cross-sectional view of FIG. 2, taken along line B-B.

In an example illustrated in these diagrams, there is provided a gate G communicating with a cavity 3, between the movable mold 1 and the fixed mold 2, as a pair of halved molds included in the mold 50, and at the same time, a runner 49 is formed as a resin passage connected with the cavity 3 via the gate G. On a mold plate 10 of the fixed mold 2, a sprue bushing 47 is attached. The sprue bushing 47 forms a sprue 48 connected to the runner 49 at a right angle.

A mold main body 4 of the movable mold 1 includes two core mold guide members 5 (5a and 5b) and mold plates 6 and 7 that hold these members. Inside the core mold guide member 5, core molds 11 (11a and 11b) as lens molds are housed so as to be slidable in the right-angle direction with respect to the parting line PL.

The mold main body 8 of the fixed mold 2 includes two core mold guide members 9 (9a and 9b) and the mold plate 10. The core mold guide member 9 is held by the mold plate 10 and a mold mounting member 15. Inside the core mold guide member 9, core molds 12 (12a and 12b) as lens molds are housed so as to be slidable in the right-angle direction with respect to the parting line PL.

The mold 50 including the movable mold 1 and the fixed mold 2 forms the cavity 3 between the movable mold 1 and the fixed mold 2, by the core mold 11 on the movable mold 1 side, and by the core mold 12 on the fixed mold 2 side, and forms a molding surface on the core molds 11 and 12 corresponding to the shape of the plastic lens to be molded.

In the present embodiment, a plastic lens to be molded is a progressive power lens having directivity, to which a corresponding direction has been set on a molding surfaces of the core molds 11 and 12. For example, in an illustrated example, the horizontal direction in a front view of a molding surface corresponds to the vertical direction of an eyeglass lens as a molded product, and the vertical direction in a front view of a molding surface corresponds to the horizontal direction of the eyeglass lens as a molded product.

In the present embodiment, by using insert molding including arranging a polarizing film as an insert member inside the cavity 3, and injecting and filling melted raw material resin, a plastic lens is molded integrally with the polarizing film.

The mold 50 in the present embodiment is configured such that the lens direction is set on a molding surface of each of the core molds 11 and 12. A polarizing film is arranged on the molding surface in a correct direction and then injection molding is performed, thereby molding a plastic lens combining a function of a progressive power lens and a function of a polarizing lens.

Figure 5:
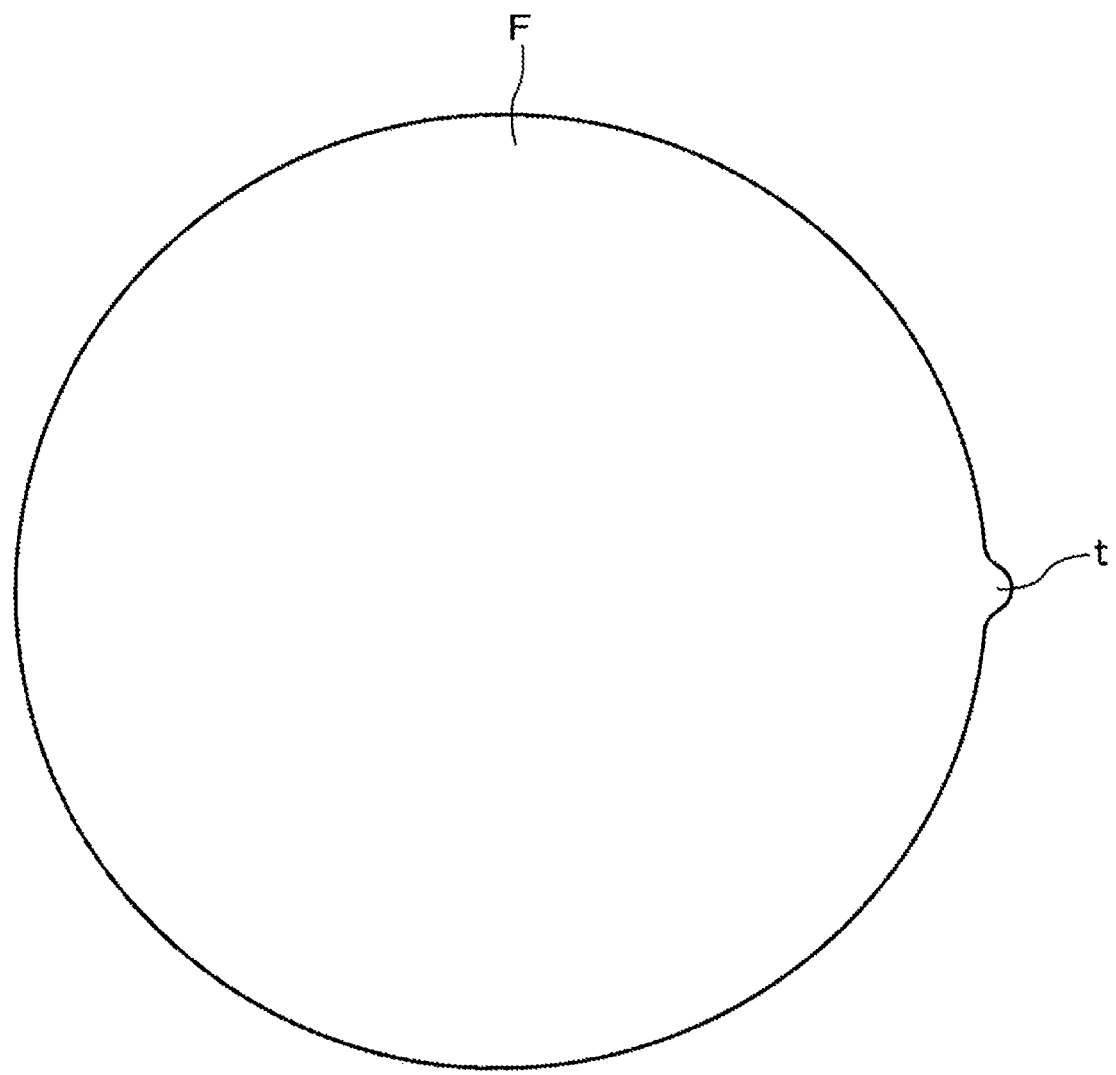
FIG. 5 is a diagram illustrating a polarizing film.
Figure 6:
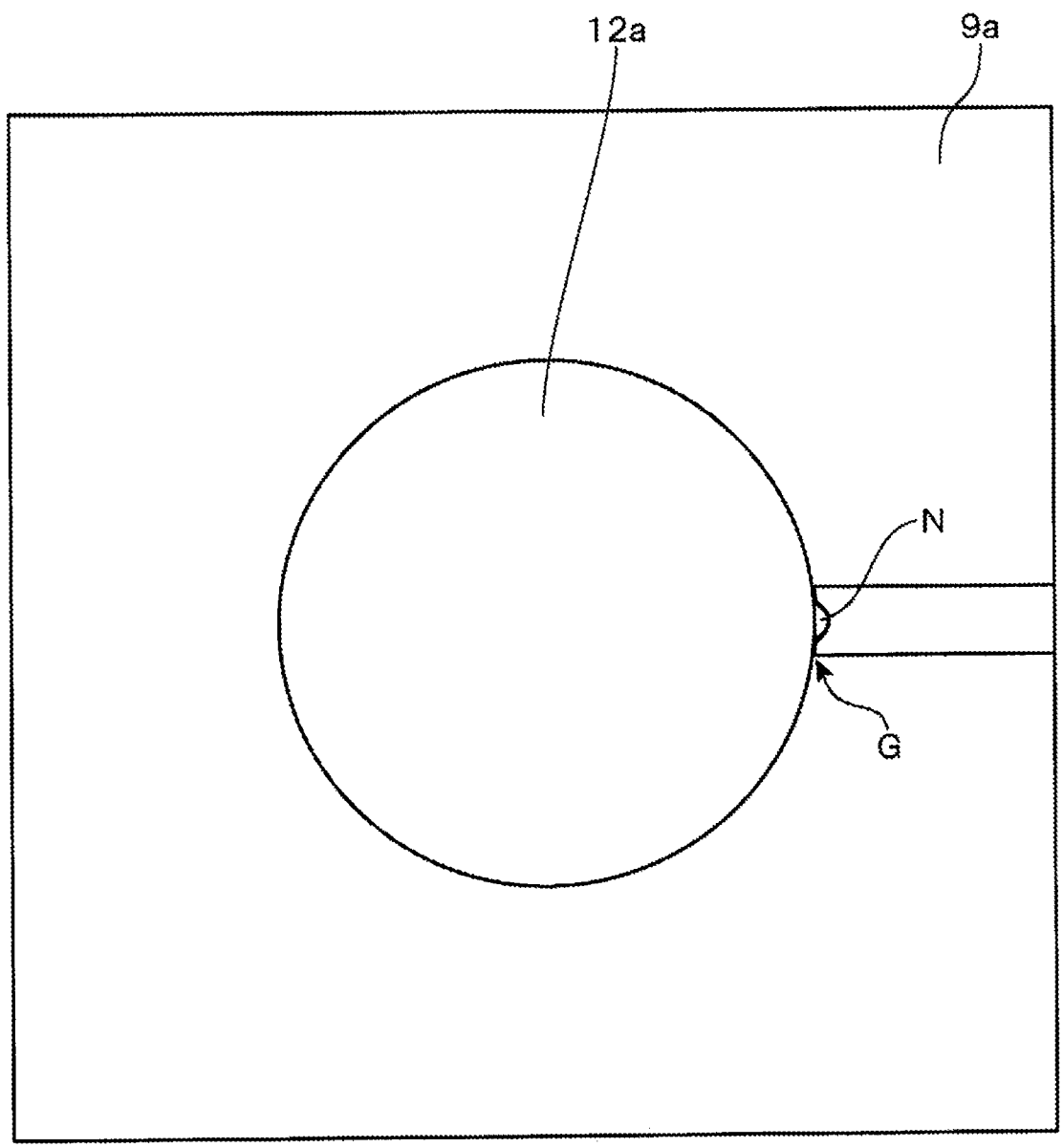
FIG. 6 is a front view of a molding surface of a core mold 12a on a fixed mold side, illustrated in FIG. 2, viewed from a movable mold side, illustrating an embodiment of the present invention.

FIG. 5 is a diagram illustrating a polarizing film. FIG. 6 is a front view of a molding surface of the core mold 12a on a fixed mold side illustrated in FIG. 2, viewed from the movable mold 1 side.

As illustrated in FIG. 5, a polarizing film F is formed in a perfect circle-like shape corresponding to the molding surface of the core mold 12a. On the periphery of the polarizing film F, a positioning tab (hereinafter, referred to as a tab t) having a substantially semicircular protruding shape is formed. Although not illustrated, a polarization axis on the polarizing film F is orthogonal to a line connecting the circle center with the tab t.

The polarizing film F includes a polarization axis in a fixed direction and has a function of a filter that causes a polarization component vibrating in the same direction as the polarization axis to attenuate and that allows a polarization component vibrating in a direction orthogonal to the polarization axis to transmit. When the lens is incorporated into the eyeglass frame, the polarization axis of the polarizing film F is arranged to be horizontal.

As described above, in the illustrated example, the horizontal direction in a front view of a molding surface corresponds to the vertical direction of an eyeglass lens as a molded product, and the vertical direction in a front view of a molding surface corresponds to the horizontal direction of the eyeglass lens as a molded product. Accordingly, the polarizing film F needs to be positioned such that the polarization axis matches the vertical direction of the molding surface in a relationship with the molding surface of the core mold 12a. To achieve this, a notch N having a shape corresponding to the tab t of the polarizing film F is formed at a position of the gate G corresponding to the horizontal direction of the molding surface. Specifically, as illustrated in FIG. 6, the notch N is configured to have a substantially semicircular recess shape corresponding to the shape of the tab t to enable the notch N and the tab t to be engaged with each other.

In other words, the mold 50 in the present embodiment is configured such that, at arrangement of the polarizing film F on the molding surface, the notch N engaged with the tab t formed on the periphery of the polarizing film F is engraved on the parting surface PS of the mold 50 so as to overlap with the gate G position.

With this configuration, when the tab t is positioned in accordance with the gate G position at arrangement of the polarizing film F on the molding surface, the tab t and the notch N are engaged with each other, and in this state, the polarization axis of the polarizing film F matches the vertical direction of the molding surface. In other words, when the tab t is engaged with the notch N engraved overlapping with the gate G position, the direction toward the molding surface of the polarizing film F is correctly fixed.

Accordingly, according to the present embodiment, gate cut and the cutting of the tab t can be performed with one step, making it possible to save labor in post-processing of the molded product.

Figure 7:
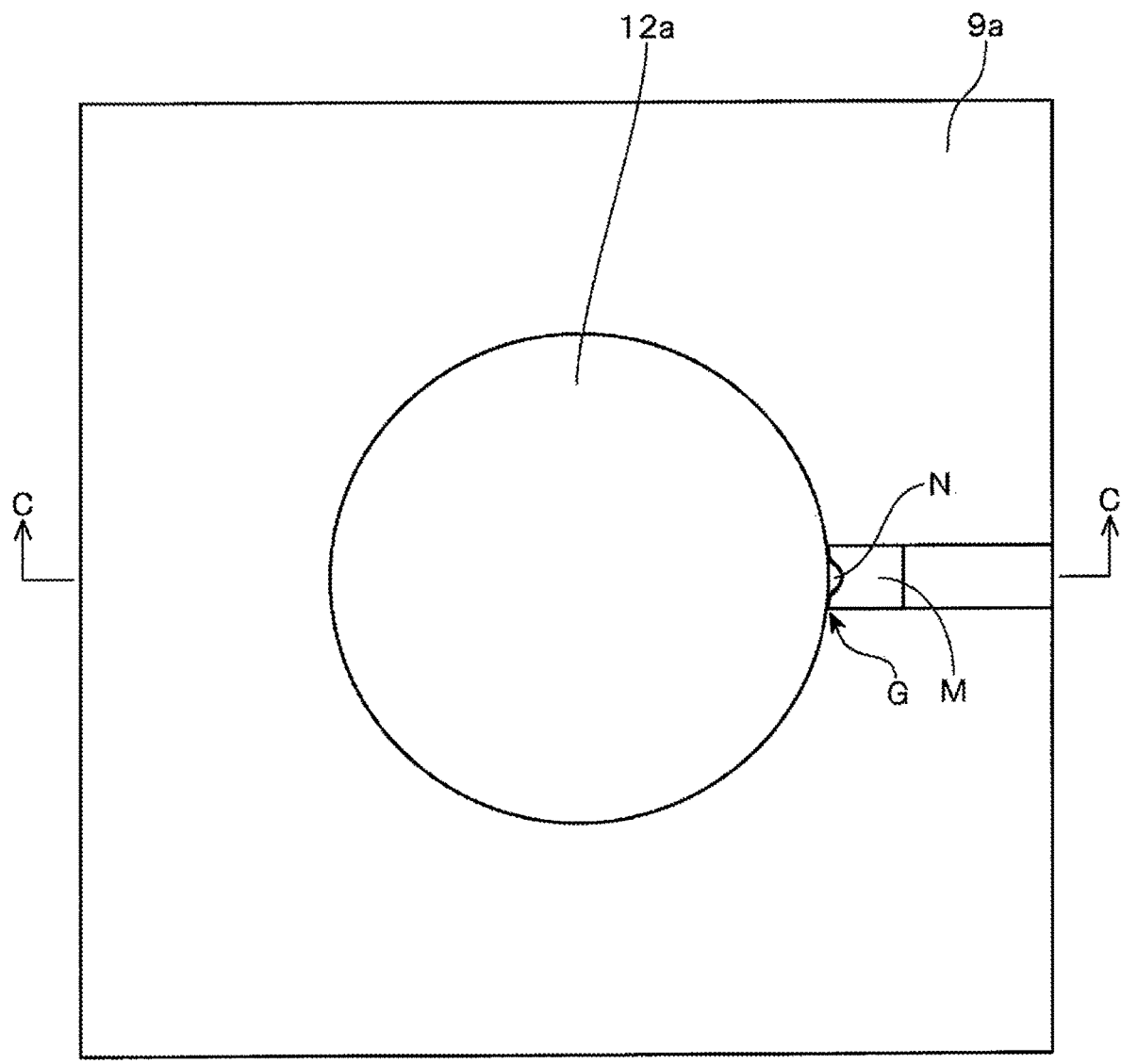
FIG. 7 is a front view of the molding surface of the core mold 12a on the fixed mold side, illustrated in FIG. 2, viewed from the movable mold side, illustrating a modification example of an embodiment of the present invention.
Figure 8:
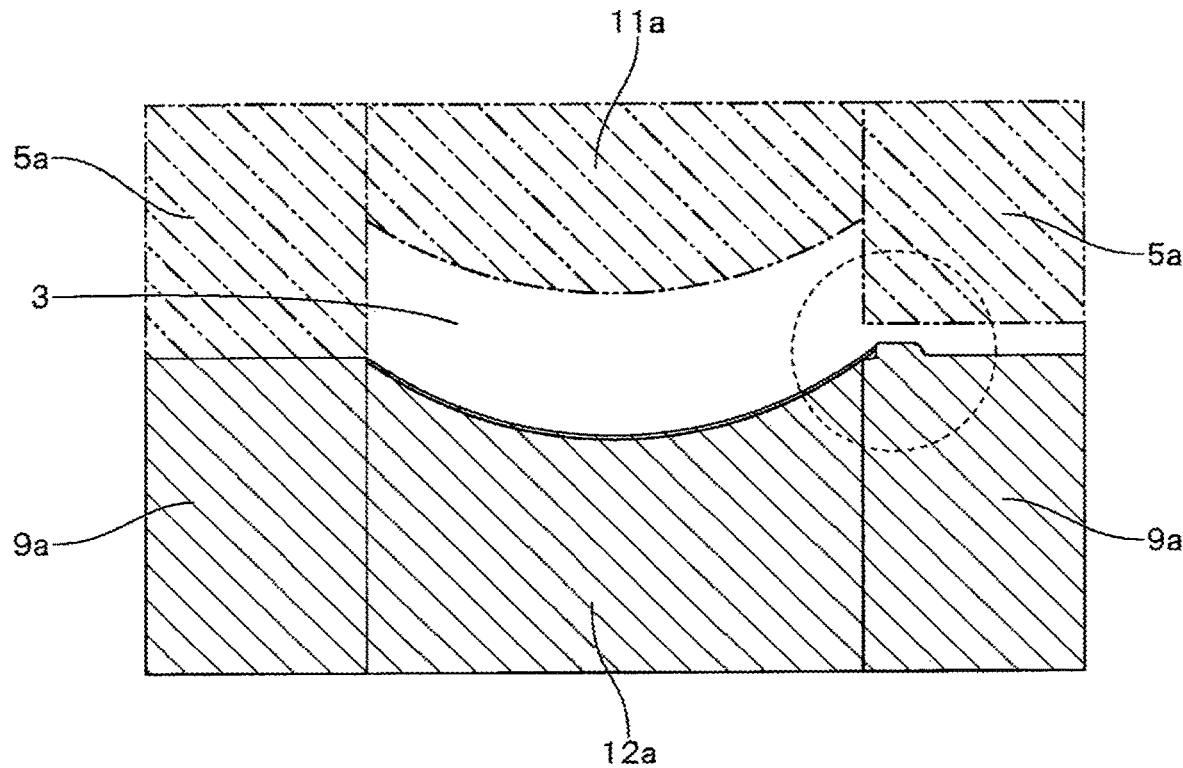
FIG. 8 is a cross-sectional view of FIG. 7, taken along line C-C.
Figure 9:
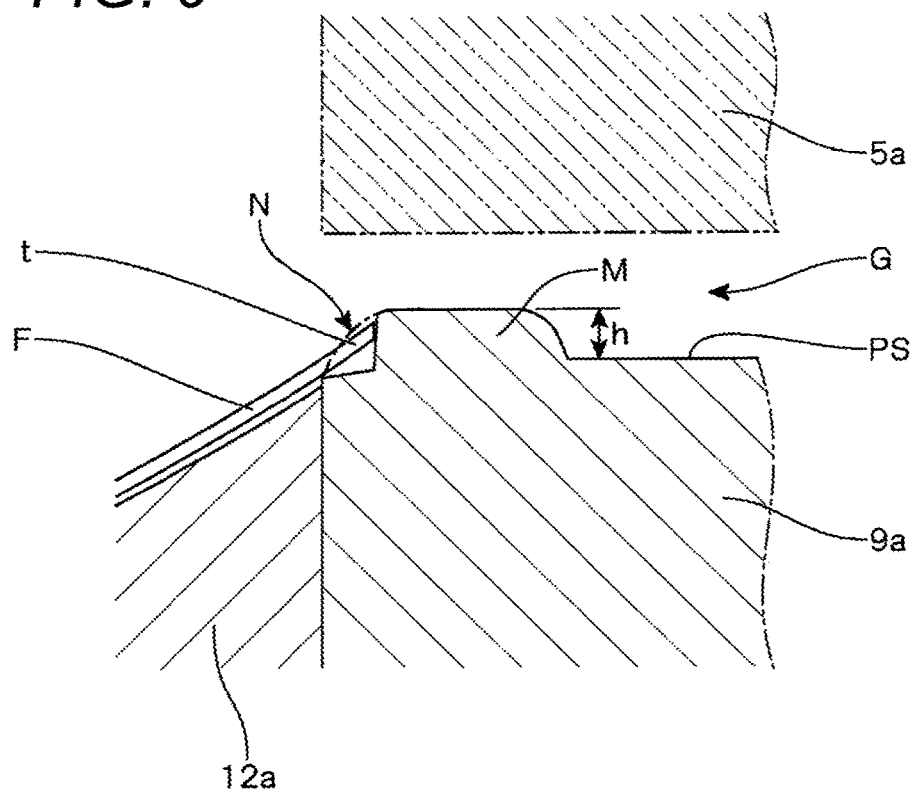
FIG. 9 is an enlarged main portion cross-sectional view, illustrating an enlarged view of a portion enclosed with a chained line in FIG. 8.

Similarly to FIG. 6, FIG. 7 is a front view of a molding surface of the core mold 12a on the fixed mold side, illustrating a modification example of the present embodiment. FIG. 8 is a cross-sectional view of FIG. 7 taken along line C-C. FIG. 9 is an enlarged main portion cross-sectional view, illustrating an enlarged view of a portion enclosed with a chained line in FIG. 8.

In the modification example illustrated in these diagrams, in engraving the notch N engaged with the tab t formed on the polarizing film F, onto the parting surface PS on the fixed mold 2 side, overlapping with the gate position, a protrusion M that defines an opening shape of the gate G is formed at a position of the gate G communicating with the cavity 3, at the parting surface PS on the fixed mold 2 side.

Specifically, the protrusion M is formed to have a portion of the parting surface PS of the core mold guide member 9a on the fixed mold 2 side protruding in a trapezoidal shape, and at the same time, a cavity-side surface of the protrusion M is cut out in a semicylindrical shape, thereby forming the notch N having a semicircular recess shape in a front view.

A height h of the protrusion M is determined to be a height that would not at least permit the tab t to deviate from the upper portion of the protrusion M when the polarizing film F is arranged at the molding surface. In short, by providing the protrusion M illustrated in FIG. 9, it is possible to engage the tab t at the gate G position while preventing the tab t from deviating into a portion inside the gate G. Note that, without the protrusion M, the tab t would deviate into the portion inside the gate G.

With this configuration, it is not only possible to arrange the polarizing film F by positioning its polarization axis in a proper direction, but possible to avoid an inconvenience caused by the molten resin flowing into the portion between the tab t and the molding surface without inhibiting the flow of the molten resin by the tab t. Accordingly, it is possible to avoid deterioration of the quality of the molded product.

Meanwhile, the core mold 12 is exchangeable as described below and the curvature of the molding surface differs depending on the core mold 12 to be mounted. Accordingly, the height of deviation of the tab t (height from the parting surface when it is assumed that there is no protrusion M) also varies with this.

Figure 10:
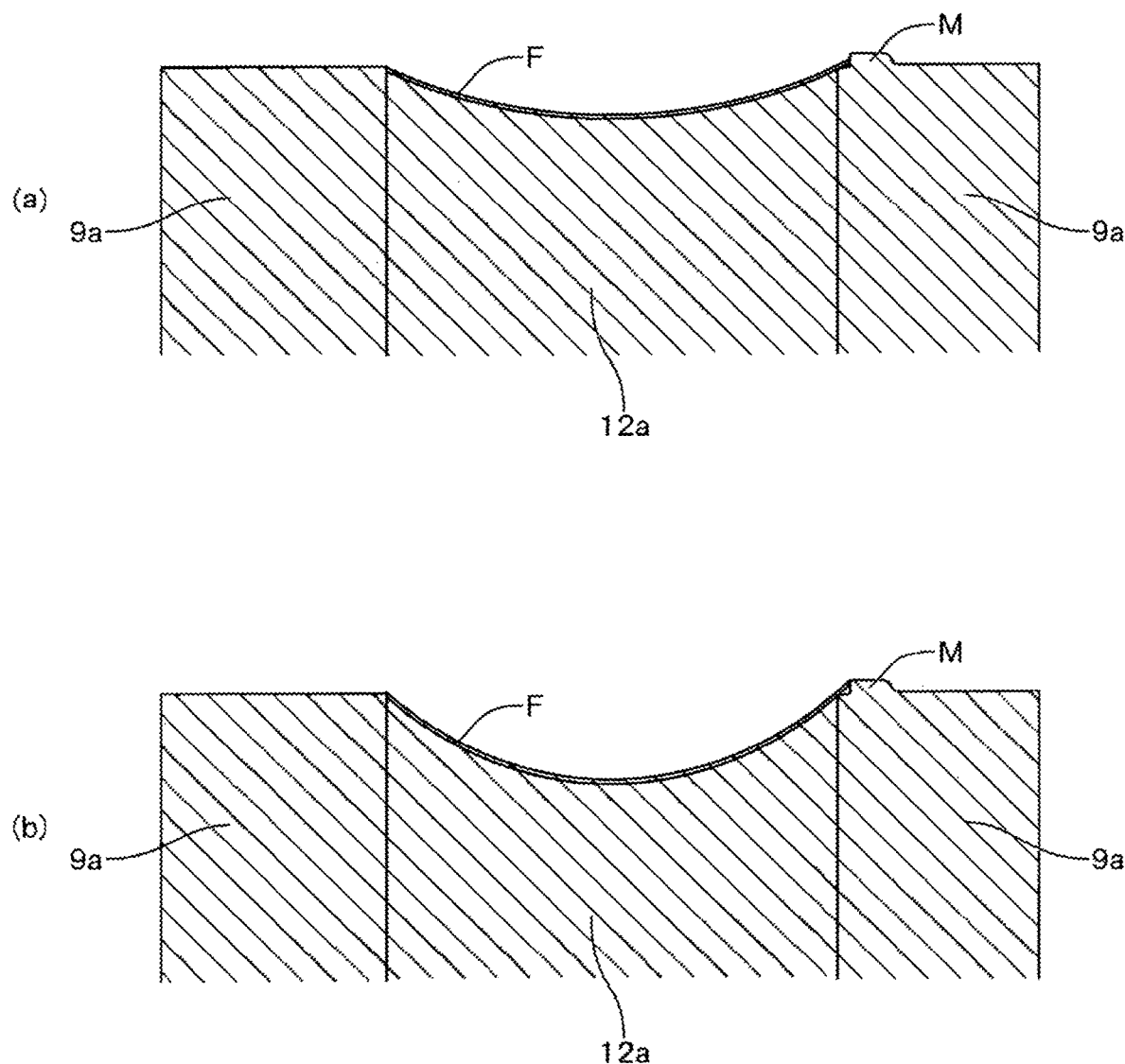
FIGS. 10(a) and 10(b) are diagrams illustrating exemplary molded products molded by using a mold for a plastic lens, according to the present invention.

For example, in the case of the core mold 12a having a gentle curvature molding surface, as illustrated in FIG. 10(a), the height of deviation of the tab t is low. In contrast, in the case of the core mold 12a having a sharp curvature molding surface, as illustrated in FIG. 10(b), the height of deviation of the tab t is high. To cope with this, the height h of the protrusion M is determined to be a height that can absorb variation of the protrusion height of the tab t, being different depending on the core mold 12, when the polarizing film F is arranged along the molding surface.

Specifically, the height h of the protrusion M is set to a height of deviation of the tab t generated when the polarizing film F is arranged on the molding surface of the core mold 12 having the maximum curvature, among the exchangeable core molds 12. For example, the height h of the protrusion M is preferably set in a range of 0.7 mm to 2.5 mm.

With this setting, it is possible to achieve effects of the present invention even after the core section 12 is exchanged, without having to exchange other components such as the core mold guide member 9.

The opening shape of the gate G changes according to the height and shape of the protrusion M, and along with this change, the flow of molten resin also varies. Accordingly, the height and shape of the protrusion M is set in view of liquidity of the molten resin flowing from the gate G into the cavity 3.

For example, in the present embodiment, the protrusion M is formed such that its upper side portion undergoes rounding processing in an R-shape. With this processing, the molten resin flowing toward the side portion of the protrusion M among the molten resin flowing from the runner 49 side can be smoothly merged into an upper portion of the protrusion M. Accordingly, it is possible to form the protrusion M not only into the above-described trapezoidal shape but also into other various shapes on the basis of the height of the tab t and liquidity of the molten resin.

In the above-configured mold 50, the mold main body 4 of the movable mold 1 is fixed on the movable die plate 64 via a mold mounting member 16, while the mold main body 8 of the fixed mold 2 is fixed to the fixed die plate 61 via the mold mounting member 15. With this configuration, the mold 50 is mounted between the fixed die plate 61 and the movable die plate 64.

On the mold mounting member 16 on the movable mold 1 side, a hydraulic cylinder 19 is provided corresponding to each of the core molds 11, and a piston rod 21 connected to a piston 20 penetrates through a back insert 22 that is fixed to one end side of the hydraulic cylinder 19. A T-shaped clamp member 23 provided at the tip end of each of the piston rods 21 is detachably engaged with a T-shaped groove 24 formed on a back surface (surface opposite to the surface at which the molding surface is formed) of the core mold 11.

With this configuration, in a state where the mold 50 is opened, the piston rod 21 of each of the hydraulic cylinders 19 is caused to advance to allow the T-shaped clamp member 23 provided at the tip end of each of the piston rods 21 to protrude from the core mold guide member 5, whereby the core mold 11 can be exchanged according to the plastic lens to be molded. When the piston rod 21 of each of the hydraulic cylinders 19 retreats, the core mold 11 mounted on the T-shaped clamp member 23 is housed inside the core mold guide member 5.

Similarly, on the mold mounting member 15 on the fixed mold 2 side, a hydraulic cylinder 26 is provided corresponding to each of the core molds 12, and a piston rod 28 connected to a piston 27 penetrates through the mold mounting member 15. A T-shaped clamp member 29 provided at the tip end of each of the piston rods 28 is detachably engaged with a T-shaped groove 30 formed on a back surface (surface opposite to the surface at which the molding surface is formed) of the core mold 12.

With this configuration, in a state where the mold 50 is opened, the piston rod 28 of each of the hydraulic cylinders 26 is caused to advance to allow the T-shaped clamp member 29 provided at the tip end of each of the piston rods 28 to protrude from the core mold guide member 9, whereby the core mold 12 can be exchanged according to the plastic lens to be molded. When the piston rod 28 of each of the hydraulic cylinders 26 retreats, the core mold 12 mounted on the T-shaped clamp member 29 is housed inside the core mold guide member 9.

When the mold main body 4 of the movable mold 1 is fixed to a movable die plate 64, the mold main body 4 is mounted, as illustrated in FIG. 3, on the mold mounting member 16 formed of a first member 16A and a second member 16B, with a bolt 17. At this time, between the mold main body 4 of the movable mold 1 and the mold mounting member 16, a plurality of disc springs 17A, inserted in the outer periphery of the bolt 17, is interposed, whereby a gap S is formed between the mold main body 4 of the movable mold 1 and the mold mounting member 16.

This gap S is closed by a mechanism in which, after the molding mold 50 is closed, the movable die plate 64 further advances, and the mold mounting member 16 guided by a guide pin 18 is pressed against the elastic force of the disc spring 17A. With this closing, in an illustrated example, each of the hydraulic cylinders 19 provided on the mold mounting member 16 presses the core mold 11 via the back insert 22. In this manner, the volume of the cavity 3 at the time of clamping is made variable, and the molten resin injected and filled inside the cavity 3 can be pressure-compressed by the core mold 11.

In addition, the guide pin 18 protrudes to the fixed mold 2 side and is inserted through an insertion hole provided in the fixed mold 2 so as to also guide the opening-closing operation of the mold 50.

Furthermore, a pressure receiving member 32 is mounted on the other end side of the hydraulic cylinder 19 provided on the mold mounting member 16 on the movable mold 1 side. When an eject rod 34 inserted through a hole 33 formed on the mold mounting member 16 presses the pressure receiving member 32, the hydraulic cylinder 19, the back insert 22 and the core mold 11 are also pressed, whereby lenses molded inside the cavity 3 are pushed out.

Together with this, in the middle of the mold mounting member 16, an eject pin 35 is arranged so as to be movable back and forth in the direction parallel with the opening-closing direction of the mold 50. When a pressure receiving member 36 provided on the eject pin 35 is pressed by an eject rod 38 inserted through a hole 37 formed on the mold mounting member 16, the eject pin 35 is pushed out.

Accordingly, at opening of the mold, a molded product can be taken out by causing the eject rods 34 and 38 to advance.

As illustrated in FIG. 4, a spring force of a spring 42 wound around the outer periphery of an eject return pin 41 acts on the pressure receiving member 36, in the left direction in FIG. 4. Although not illustrated, there is a similar configuration to cause the spring force in the left direction in FIG. 4 to act also on the pressure receiving member 32. With this configuration, when the eject rods 34 and 38 retreats, the pressure receiving members 32 and 36 also retreats to return to a stand-by position.

As illustrated in FIG. 4, the mold 50 includes a nozzle shut mechanism 90 that blocks a nozzle 85 of the injection apparatus 80. The nozzle shut mechanism 90 includes a nozzle shut pin 91 as a blocking member that protrudes inside the sprue 48 formed by the sprue bushing 47. This nozzle shut pin 91 is connected to a piston rod 94 of a hydraulic cylinder 93 through a connection piece 92, and the hydraulic cylinder 93 is fixed to the mold mounting member 15 by a cylinder mounting plate 95. With this configuration, when the hydraulic cylinder 93 is operated in the state where the nozzle 85 is press-contacted against the sprue bushing 47, the nozzle shut pin 91 protrudes inside the sprue 48 to block the nozzle 85, thereby preventing a backflow of the resin.

[Method for Manufacturing Plastic Lens]

Figure 12:
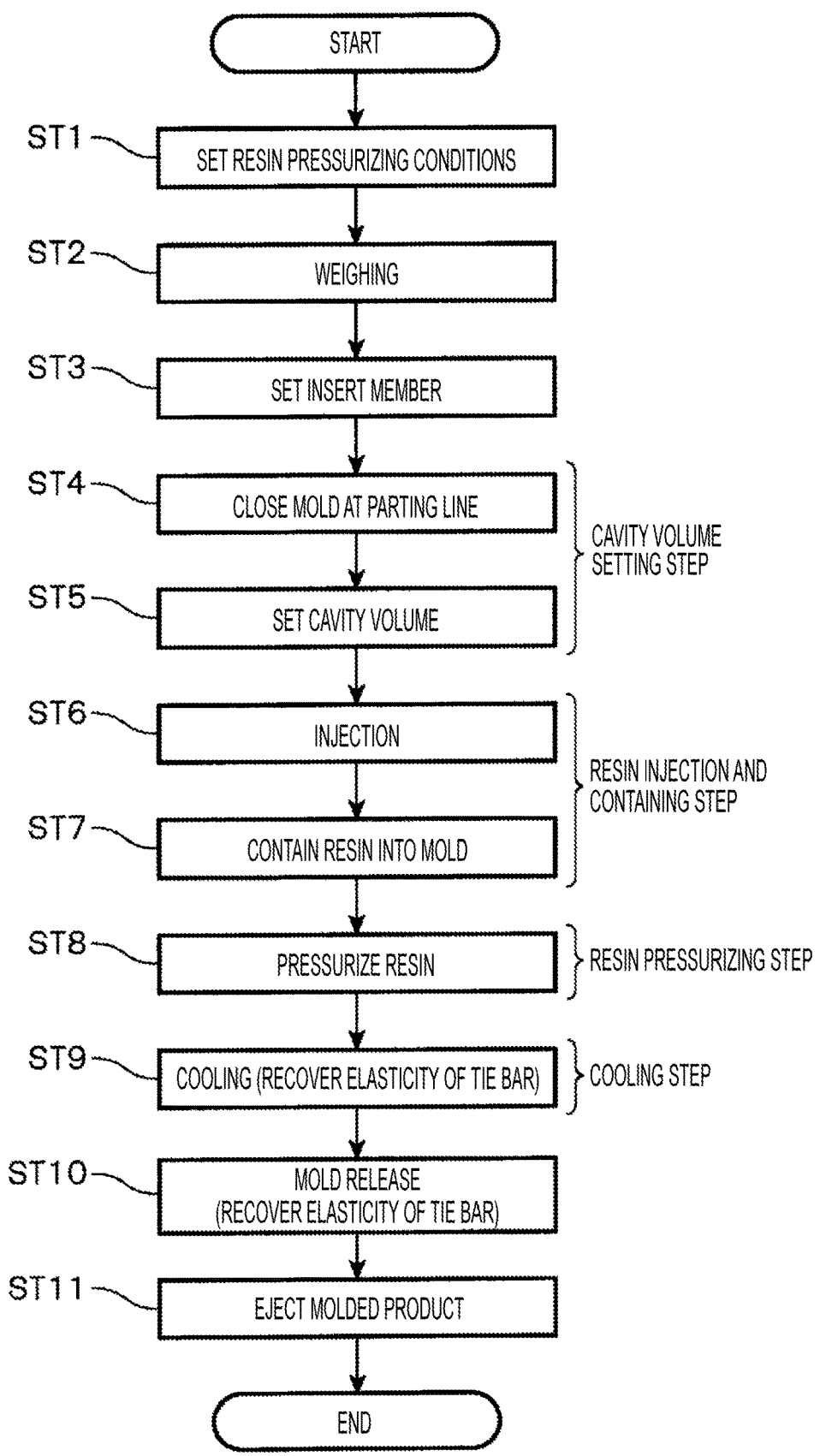
FIG. 12 is a flowchart illustrating steps in a method for manufacturing a plastic lens, according to an embodiment of the present invention.

For manufacturing a plastic lens using the above-described injection molding apparatus, for example, steps (ST1 to ST11) illustrated in a flowchart in FIG. 12 can be sequentially executed.

In ST1, resin pressurization conditions are set. This is intended to adjust the clamping force in accordance with the characteristics (lens shape, lens power, or the like) of a plastic lens to be molded so as to add appropriate pressure to the resin in the cavity 3 beforehand.

In ST2, weighing is performed. On the injection apparatus 80, pellet-like raw material resin fed from the hopper 81 is sheared and crushed by a screw rotating in the heating cylinder 82 and together with this, while being melted and kneaded by the shearing heat and the heat generated by a heater included in the heating cylinder 82, transmitted to a cylinder front chamber formed between the tip end of the screw and the nozzle 85, and weighed. Herein, the amount of molten resin needed to be filled in the cavity 3, the runner 49 and the sprue 48 is weighed.

As the raw material resin, thermoplastic resin such as polycarbonate resin and acrylic resin, commonly used for forming this type of plastic lens, can be used.

In ST3, an insert member (polarizing film F) is set. This is a step of arranging a prepared insert member on a molding surface of the core mold 12a.

In ST4, the mold is closed at the parting line PL. Specifically, when the crosshead 73 is caused to advance by the operation of the toggle link mechanism 65, the toggle links 71A and 71B extend and the movable die plate 64 advances toward the fixed die plate 61, thereby closing the mold 50. At this time, while the gap S is maintained in a state where the disc spring 17A interposed between the mold main body 4 of the movable mold 1 and the mold mounting member 16 is not compressed, the fixed mold 2 and the movable mold 1 are closed at the parting line PL. In this state, the gap S is set to the maximum opening amount.

In ST5, the cavity volume is set. From a state where the movable mold 1 and the fixed mold 2 are in close contact with each other at the parting line PL in ST4, the crosshead 73 is caused to further advance to a preset position (cavity volume setting position). With this operation, the toggle links 71A and 71B extend to move the movable die plate 64 toward the fixed die plate 61 until it reaches a cavity expanding position. The cavity expanding amount is determined by crosshead position setting. As a result, the gap S of the mold 50 is reduced to leave the amount for cavity expansion. At this time, the volume of the cavity 3 (wall thickness) is expanded to be greater than the volume of a lens (wall thickness) to be molded, namely, wall thickness of a molded product to be taken out. Since the disc spring 17A is compressed, some clamping force is generated as a counterforce against the compression.

In ST6, injection is performed. The molten resin weighed in ST2 is injected to the mold 50 through a passage of the injection nozzle 85. That is, the molten resin that has been fed into the heating cylinder 82 of the injection apparatus 80 and weighed is injected. As a result, the molten resin is injected from the nozzle 85 formed at the tip end of the heating cylinder 82, and is filled inside the cavity 3 via the sprue 48, the runner 49 and the gate G. When the molten resin is filled into the cavity 3, the injection speed is controlled at a fixed speed.

In ST7, the resin is contained inside the mold. After the predetermined amount of resin is injected in ST6 and immediately before the completion of injection and filling of the molten resin, the crosshead 73 is caused to further advance. After completion of injection and filling, the nozzle shut pin 91 is immediately caused to protrude inside the sprue 48 by the nozzle shut mechanism 90, thereby blocking the nozzle 85. As a result, the molten resin that has been filled can be contained inside the mold 50 in a compression-pressurized state.

In ST8, pressurization of the resin is performed. In ST7, when the crosshead 73 starts to advance and the crosshead 73 stops after advancing to the original point (zero position), the toggle links 71A and 71B extend to their full lengths. At this time, the movable die plate 64 further advances, each of the hydraulic cylinders 19 provided on the mold mounting member 16 presses the core mold 11 via the back insert 22. Subsequently, the core mold 11 slides inside the core mold guide member 5 and pressure-compressions the molten resin injected and filled inside the cavity 3.

In ST9, cooling is performed. Temperature control of a temperature control fluid is performed by a mold temperature control apparatus 51 such that the temperature of individual portions (insert, core mold guide member, or the like) of the mold 50 becomes an appropriate temperature in accordance with the characteristics of a lens to be molded and the characteristics of the insert member. When the molten resin contained inside the mold 50 is cooled in the compression-pressurized state, the raw material resin that has been injected and filled in the cavity 3 is solidified and shrunk as cooling proceeds in the pressure-compressed state, whereby a plastic lens having a predetermined volume is molded.

In ST10, mold release operation is performed. The mold release operation causes the crosshead 73 in the toggle link mechanism 65 to retreat toward the rear plate 62, thereby opening the mold 50.

In ST11, operation of ejecting a molded product is performed. When the crosshead 73 is caused to retreat to the end, the distance between the movable die plate 64 and the fixed die plate 61 is maximized, and the mold 50 is split along the parting line PL and opened. At this mold opening, a molded plastic lens is taken out by causing the eject rods 34 and 38 to advance. In other words, the eject rod 34 presses the pressure receiving member 32, the hydraulic cylinder 19, the back insert 22 and the core mold 11, and the core mold 11 slides the inner portion of the core mold guide member 5, thereby pushing out lenses molded inside the cavity 3.

Figure 11:
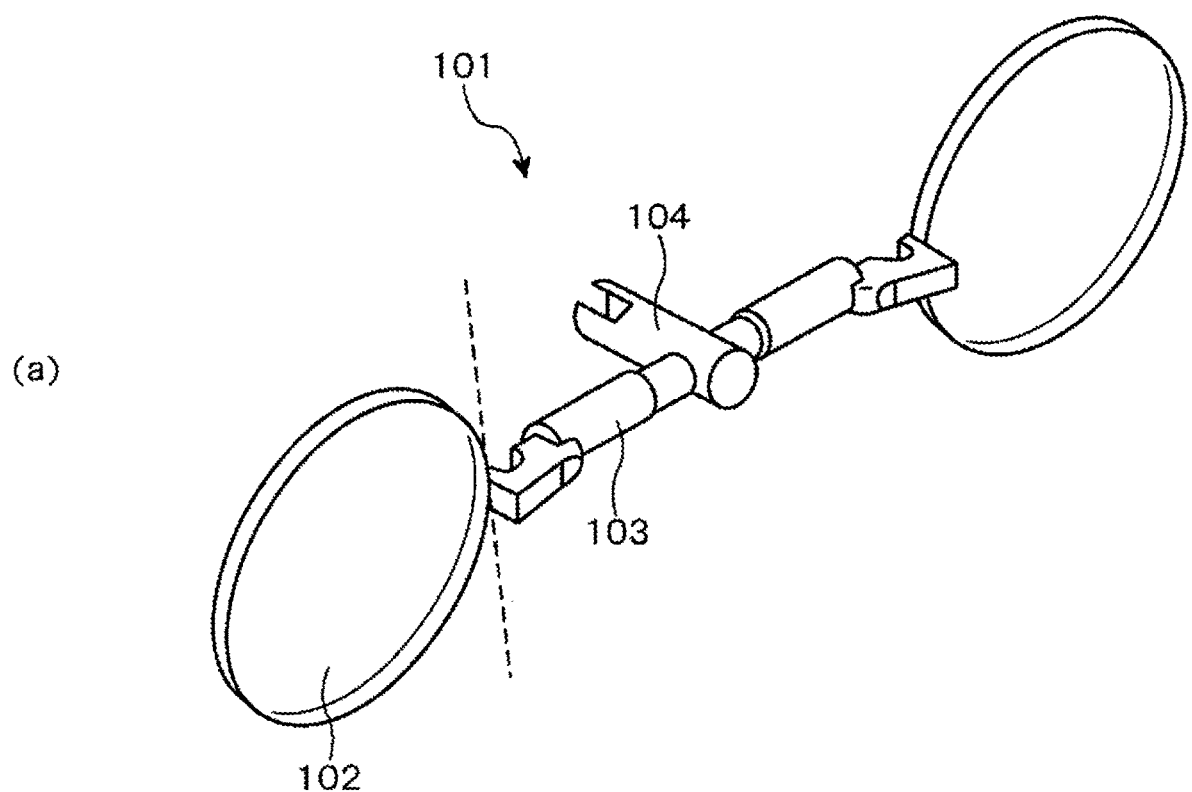
FIGS. 11(a) and 11(b) are enlarged main portion cross-sectional views of FIG. 8, with different molding surface curvatures.
Figure 11:
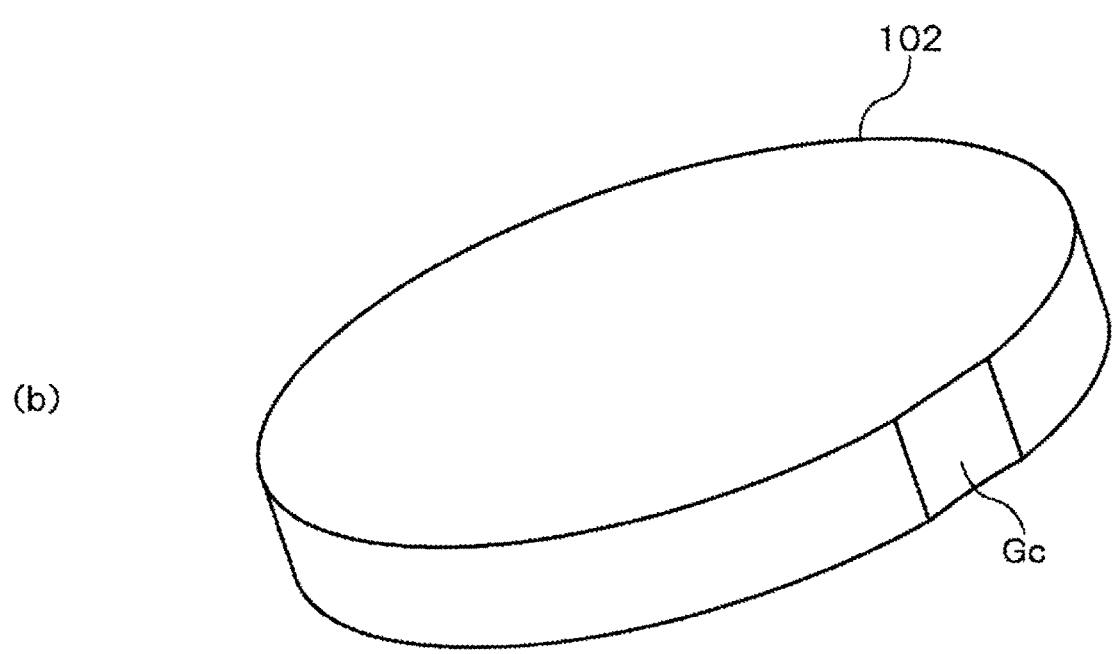

As illustrated in FIGS. 11(a) and 11(b), the plastic lens molded in this manner is taken out of the mold 50 in a state where a lens unit 102 molded by the cavity 3, an interlink unit 103 molded by the runner 49, and a rod-like section 104 molded by the sprue 48 are connected with each other.

In order to provide the lens as an eyeglass lens onto the market, the lens unit 102 is separated from the interlink unit 103. After this procedure, the lens can be provided onto the market as an eyeglass lens. Specifically, by cutting a connecting portion Gc between the lens unit 102 and the interlink unit 103 using a cutting means such as a cutter and a nipper, it is possible to obtain a plastic lens for an eyeglass as illustrated in FIG. 11(b).

As described above, in the present embodiment, the notch N is provided to be engaged with the positioning tab t formed at the periphery of the polarizing film F, and provided to overlap with the gate G position. Positioning of the polarizing film F is performed by causing the positioning tab t to be engaged with the notch N. The tab t, which is provided for positioning the polarizing film F and becomes unneeded, can be cut off at the same time that the lens unit 102 is separated from the interlink unit 103. As a result, it is possible to save labor in cutting processing of a molded product. Furthermore, when dip coating is performed on the separated lens unit 102, by directing the trace portion generated at removal from the interlink unit 103 downwards, it is possible to suppress uneven coating due to liquid pool and maintain quality of a molded product.

In the modification example of the present embodiment, as described above, the notch N is configured to be engraved overlapping with the gate position such that, the protrusion M is formed to define the opening shape of the gate G at the position of the gate G communicating with the cavity 3, and that the notch N is engraved on the protrusion M, making it possible to prevent inhibition of the molten resin flow. By molding a plastic lens in this mode, it is possible to manufacture the plastic lens with good moldability without deteriorating the quality.

While the invention has been described with reference to preferred embodiments, the present invention is not intended to be limited to the embodiments described above, and it is needless to say that various modifications can be performed in the scope of the present invention.

For example, in the embodiment described above, the description uses an example employing a polarizing film F as an insert member. Alternatively, however, it is also possible to employ, as the insert member, a functional film having various functions such as a light control function and an antireflection function.

Exemplary application of the present invention to a progressive power lens has been described. Alternatively, however, the present invention is not limited to such an exemplary case but also applicable to the case of integrating an insert member having directivity such as a polarizing film with a lens having directivity, including a double focus lens that has a far region in the upper portion of the lens and a near region in the lower portion of the lens, and has an intermediate region having no continuity.

The embodiment described above includes exemplary application of the present invention to the core mold 12 on the fixed mold 2 side. Alternatively, however, the present invention may be applied to the core mold 11 on the movable mold 1 side, or applied to both the movable mold 1 side and the fixed mold 2 side.

INDUSTRIAL APPLICABILITY

The present invention, in molding a plastic lens with an insert member by injection molding involving insert molding, can be used as a technique for positioning the insert member at the gate position.

Although several embodiments and/or examples of the present invention have been described in detail, various modifications of the exemplary embodiments and/or examples can be easily made by those skilled in the art without departing substantially from the novel teachings and effects of the present invention. Accordingly, these various modifications are included in the scope of the invention.

All the documents and the contents described in this specification of Japanese Patent Application underlying the Paris priority are incorporated herein.

REFERENCE SIGNS LIST 1 movable mold
2 fixed mold
3 cavity
5, 9 core mold guide member
11, 12 core mold
49 runner
50 mold (mold for plastic)
102 lens (plastic lens for eyeglasses)
G gate
F film member (insert member)
t positioning tab
M protrusion
N notch
PS parting surface

The invention claimed is:

1. A mold for a plastic lens, into a cavity of which molten raw material resin can be injected and filled so as to mold integrally with an insert member in the cavity a plastic lens having a predetermined shape, the mold comprising:
   a pair of halved molds forming the cavity therebetween;
   a gate, one end of which opens to the cavity and through which the molten raw material can be injected into the cavity; and
   the insert member, which is arranged on a molding surface on one of the halved molds, wherein
   a notch, which has a semicircular recess shape and is engaged with a positioning tab formed at a periphery of the insert member, is engraved on a parting surface on one of the halved molds so as to overlap with a width of the gate,
   the positioning tab of the insert member is engaged with the notch to position the insert member, and
   a protrusion to define an opening shape of the gate communicating with the cavity is formed on the parting surface of the one halved mold, the notch (i) being a recessed portion formed at a foot of the protrusion so as to open toward the cavity and receive the positioning tab and (ii) having a wall extending in a height direction of the protrusion so as to contact a tip end of the positioning tab, and a height of the protrusion not permitting the positioning tab received in the notch to protrude into the gate.

2. The mold for a plastic lens according to claim 1, wherein the one of the halved molds includes one of a plurality of exchangeable core molds on which the molding surface is formed, and
   the protrusion is formed so that the height of the protrusion can absorb variation of a protrusion height of the positioning tab, which protrusion height being different for each of the plurality of exchangeable core molds.

3. The mold for a plastic lens according to claim 2, wherein the insert member has predetermined directivity, and
the insert member is positioned such that a direction of the insert member with respect to the molding surface is fixed by the positioning tab being engaged with the notch.

4. The mold for a plastic lens according to claim 2, wherein the insert member is a polarizing film having a polarization axis based on fixed directivity.

5. A method for manufacturing a plastic lens having a predetermined shape, the method comprising:
arranging the insert member on the molding surface on the one of the halved molds of the mold for a plastic lens according to claim 2; and
injecting and filling the cavity between the pair of halved molds with molten raw material resin so as to manufacture integrally with the insert member the plastic lens with a predetermined shape.

6. The mold for a plastic lens according to claim 1, wherein the insert member has predetermined directivity, and
the insert member is positioned such that a direction of the insert member with respect to the molding surface is fixed by the positioning tab being engaged with the notch.

7. The mold for a plastic lens according to claim 6, wherein the insert member is a polarizing film having a polarization axis based on fixed directivity.

8. A method for manufacturing a plastic lens having a predetermined shape, the method comprising:
arranging the insert member on the molding surface on the one of the halved molds of the mold for a plastic lens according to claim 6; and
injecting and filling the cavity between the pair of halved molds with molten raw material resin so as to manufacture integrally with the insert member the plastic lens with a predetermined shape.

9. The mold for a plastic lens according to claim 1, wherein the insert member is a polarizing film having a polarization axis based on fixed directivity.

10. A method for manufacturing a plastic lens having a predetermined shape using a mold comprising (i) a pair of halved molds forming a cavity therebetween and (ii) a gate, one end of which opens to the cavity and through which molten raw material can be injected into the cavity, the method comprising:
positioning an insert member on a molding surface on one of the halved molds so that a positioning tab formed at a periphery of the insert member is engaged with a notch, which has a semicircular recess shape, engraved on a parting surface on one of the halved molds so as to overlap with a width of the gate; and
injecting and filling the cavity between the pair of halved molds with the molten raw material resin so as to manufacture integrally with the insert member the plastic lens with a predetermined shape, wherein
a protrusion to define an opening shape of the gate communicating with the cavity is formed on the parting surface of the one halved mold,
the notch (i) is a recessed portion formed at a foot of the protrusion so as to open toward the cavity and receive the positioning tab and (ii) has a wall extending in a height direction of the protrusion so as to contact a tip end of the positioning tab, and
a height of the protrusion does not permit the positioning tab received in the notch to protrude into the gate.

* * * * *